United States Patent Office 3,348,643
Patented Oct. 24, 1967

3,348,643
ELECTRO-HYDRAULIC CONTROLS FOR POWER
DRIVE SYSTEM
Miles A. Townsend, Cupertino, Calif., assignor to Twin
Disc Clutch Company, Racine, Wis., a corporation of
Wisconsin
Continuation of application Ser. No. 473,150, July 19,
1965. This application Dec. 5, 1966, Ser. No. 599,670
25 Claims. (Cl. 192—3.5)

ABSTRACT OF THE DISCLOSURE

A system for controlling the selective engagement and release of both the direction and ratio determining clutches in, as well as the modulated clutch when precedes, a multi-ratio power transmission for a crawler-type tractor by transistor control circuits interconnected so as to respond not only to a manual control lever positioned to call selectively for any ratio and direction, but also to the completed engagement of clutches and the speed and direction in which the vehicle is moving. The transistor circuits are arranged to control the energization of solenoids which in turn control the engagement of respective clutches, and conduction in each main transistor circuit is dependent not only upon switches actuated by the manual control lever but also upon the state of auxiliary transistors directly controlled in response to other conditions. By such interlinking of what are physically simple transistor circuits, the control system as a whole functions with a minimum of restriction upon the freedom of the vehicle driver and with a maximum of safety for the driver and the transmission components.

---

This application is a continuation of applicant's copending parent application Ser. No. 473,150, filed July 19, 1965, and now abandoned.

The present invention relates in general to power drive systems for transmitting motive energy from a prime mover to a rotationally driven load. More particularly, the invention has to do with controls for selectively completing or interrupting the driven between the prime mover and the load, for selectively establishing a forward or reverse direction of such drive, and for selectively creating different ratios of the drive. While the invention will find advantageous employment in a wide variety of applications, it is especially useful in controlling the transmission of motive power from the engine to the track-driving wheels of crawler type tractors, and it will be described in that exemplary environment.

In the operation of bulldozers and similar types of crawler-track construction vehicles, the engine is preferably operated at a substantially constant speed under the control of an automatic governor. This is done so that the auxiliary power-operated equipment, such as an hydraulically lifted and tilted earth scoop, receives full power input, i.e., the hydraulic pump for supplying pressure fluid thereto is adequately driven from the engine irrespective of whether the vehicle is stationary or traveling at considerable speed in either direction. Yet, it is also desirable to make the bulldozer highly maneuverable so that it can be driven from the engine in either direction and at different speeds depending upon the slope of the terrain and the earth load to be moved, without stalling or overloading the constantly running engine. On straight, level runs, a high drive ratio with low torque multiplication and fast speeds is desired; but as the vehicle encounters steep grades or is operated to take heavy earth bites, it is necessary to have the drive from engine to wheels operate with a lower ratio and ground speed.

In maneuvering a conventional bulldozer, the operator is indeed taxed almost beyond human capacity. He must not only frequently start, stop and reverse the direction of vehicle travel, but he must also select and change the ratio of the drive from the constant-speed engine to the crawled tracks, so that he travels at the highest speed consistent with the resistance (scoop bite or terrain slope) to vehicle travel and the need to avoid overloading the engine. At the same time, the operator must control the raising and lowering of the scoop, and the dumping and return motions thereof. All of these demands make it difficult indeed to accomplish a given earth moving task in the shortest possible time, and they are likely to cause operator fatigue which may result in serious accidents.

It is the aim of this invention to do away with the extreme demands made on the mental and physical capacities of an operator who manipulates a power drive system. More particularly, it is an object of the invention to make it possible for an operator to control the starting, stopping, reversing, ratio and speed of drive from a constant-speed engine to the ground wheels or track of a vehicle simply by switching from one drive condition to another without worry about damage to the power transmission system.

A corollary object of the invention is to achieve the foregoing by electrical control means which are small, light, relatively inexpensive and yet reliable in operation.

Another object of the invention is to provide a power drive system and a compact, electrical control therefor which permit the operator to shift the direction or ratio of a power drive system in a single manipulative motion, and which engages and disengages direction or ratio-determining clutches of a transmission with neither undue shock and wear on the drive components nor a separate manipulation to disengage and re-engage a main clutch.

It is a more specific object of the invention to provide an electrical control for a power drive system which includes a main "modulated clutch" interposed in tandem with a multi-ratio transmission between an engine and a load, the control being characterized in that the modulated clutch is automatically and quickly disengaged whenever a control member is moved from a first position toward a second position to switch from one drive ratio to the other. The control thus assures that ratio-determining elements or clutches cannot be engaged while operating at high speeds or loads, so that they are not subjected to undue shock or wear, yet without requiring any special precautions or manipulations by the operator.

A further object of the invention is to provide a control for such a power drive system in which the modulated clutch is automatically re-engaged only after the ratio-determining elements of a multi-ratio transmission have been engaged in a newly selected pattern or condition, thereby removing the necessity for any affirmative manipulation on the part of an operator.

Still another object is to avoid undue shock and wear in such a power drive system, and undue jarring and discomfort to the operator, by causing such automatic re-engagement of the modulated clutch to occur with a gradual, progressive action—and to a degree which is adjustable to a predetermined value. More specifically, it is an object to accomplish such automatic re-engagement according to a smooth exponential, approximately linear time variation of an electrical signal.

It is an additional object to substantially lessen or eliminate shock, fatigue and wear on relatively rotatable, selectively engaged clutch elements in the reversible, multi-ratio transmission of a power drive system, which normally may be "slammed" from any direction and drive ratio setting into any other direction and drive ratio setting. In this connection, it is a more specific object of the invention to prevent or "inhibit" engagement of transmission clutches—even though the operator's manipulation otherwise calls for such engagement—unless and until the speed of the transmission output shaft is less than a predetermined safe value and to accomplish this by interconnected electrical control circuits.

In more detail, it is an objective of this invention to automatically and electrically disable a family of electric circuits, and thus to prevent or inhibit re-engagement of transmission clutches in a pattern which will drive the output shaft in a direction opposite to that in which it is turning above a predetermined speed, but to cause such re-engagement of the clutches as soon as the output shaft speed is reduced to a predetermined, safe value.

Still another object is to provide a power drive system which will "inhibit" engagement of clutches as indicated above, but which by electrical control causes the clutches to remain engaged, if the output shaft reverses directions, until they are affirmatively disengaged. This makes it possible for the operator of a bulldozer equipped with the present system to drive uphill, then "roll back" while the transmission remains engaged, and then resume drive uphill in the same transmission ratio.

A further object of the invention is to electrically disable the automatic "inhibiting" of transmission shifting under special emergency conditions, such as the failure of the vehicle braking system, so that the transmission can be "slammed" into a ratio which produces drive in a direction opposite to that in which the vehicle is traveling. Although this may be hard on the transmission clutches, it can be tolerated in these exceptional circumstances requiring use of the drive train to stop a runaway vehicle.

It is, moreover, an object of this invention to premit the engine of a power drive system to be started up when the manipulated control member or drive selector is in any of its several positions which would normally cause driving of the output shaft; and yet to do this without there being any drive established to the output shaft unless and until the control member is first moved at least momentarily into its "neutral" position, thereby to avoid dangerous runaway on starting of the engine.

These and other objects of the invention will become apparent as the following description proceeds, taken in conjunction with the accompanying drawings, in which.

While the invention has been shown and will be described in connection with exemplary, preferred embodiments, it will be understood that it is not intended to limit the invention thereto, but it is intended to cover all modifications and alternative constructions falling within the spirit and scope of the invention as expressed in the appended claims.

Figures 1, 1A:
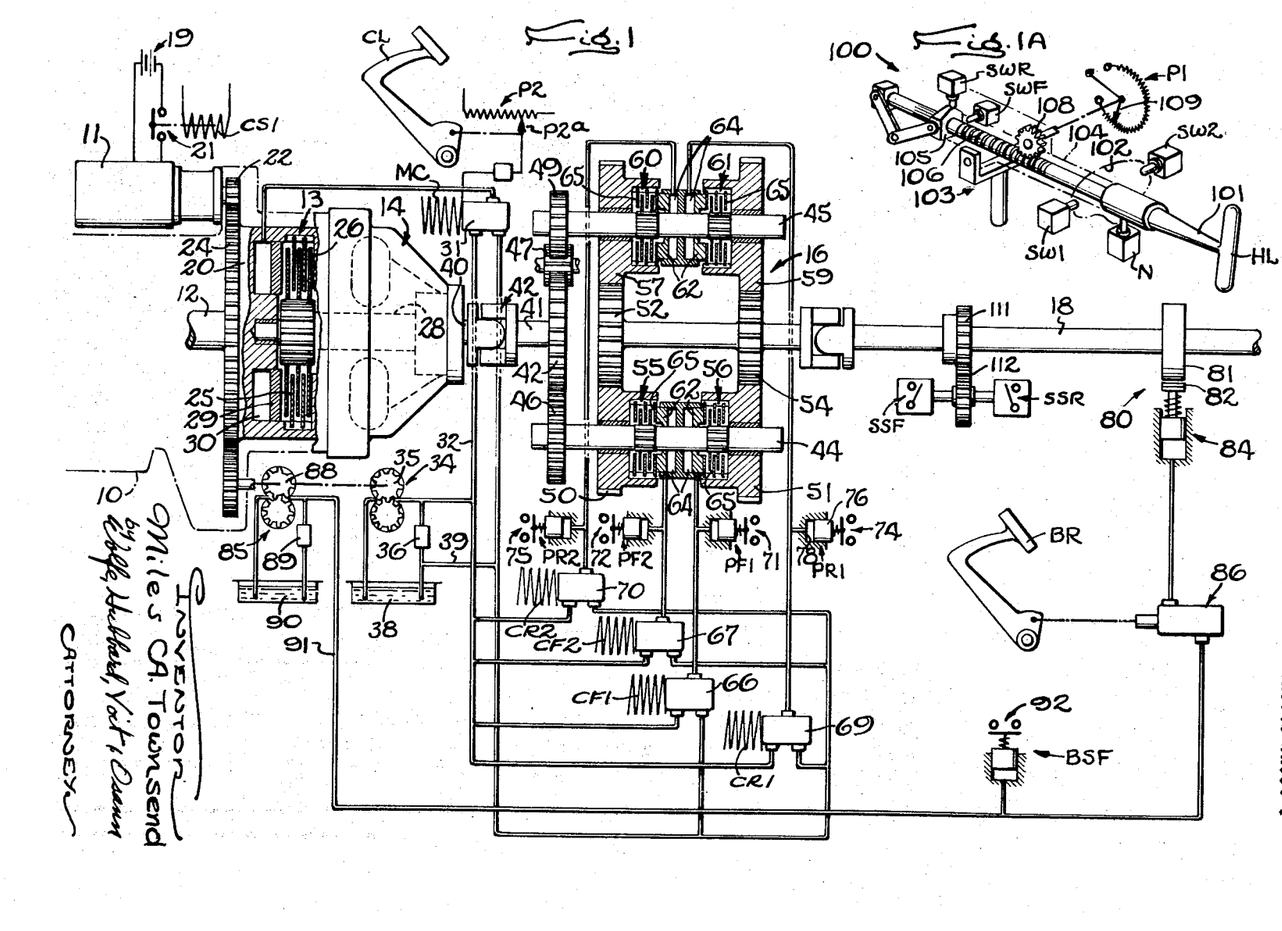
FIGURE 1 is a fragmentary, diagrammatic illustration of a power drive system for a bulldozer or the like, and utilized in an exemplary embodiment of the invention.
FIG. 1A is a diagrammatic perspective of a control assembly manipulated by an operator to selectively set the drive system of FIG. 1 to different conditions.

In the embodiment of the power drive system shown in FIG. 1 motive power is transmitted from the output shaft 12 of a prime mover or engine 10 through a disengageable "modulated clutch" 13, a torque converter 14, and a multi-ratio, reversible transmission 16 to an output shaft 18 which is coupled to the driven load (not shown). In the following description it will be assumed for purposes of discussion that the output shaft 18 is connected through appropriate steering means and a differential to the ground wheels of the endless tracks for a crawler-type bulldozer, these latter elements being well known and thus desirably omitted from the drawings.

The engine 10 may be a diesel or any other suitable type, and it preferably is operated at a substantially constant speed by a governor (not shown) in order that it may supply input energy to auxiliary power systems (not shown), such as hydraulic pump and fluid pressure supply associated, for example, with hydraulic means for raising and lowering, or tilting and retracting an earth scoop. Thus, for purposes of describing the power drive system and its control, it may be assumed that the engine shaft 12 is a constant speed input shaft which continuously turns in one direction after the engine has been started. A starter motor 11 momentarily connected to a voltage source 19 by energization of a starting solenoid CS1 and closure of contacts 21 serves to crank the engine flywheel 20 by drive from a pinion 22 to a ring gear 24, thereby to afford start-up of the engine in the usual manner.

The modulated clutch 13 is designed to operate continuously with any desired slippage, determined by the pressure with which its interleaved friction plates are pressed together. This clutch is especially rugged and capable of engaging and disengaging under full speed and load, particularly because of the cushioning effect of the tandemly connected torque converter 14. Further details regarding the modulated clutch, and the cooling thereof which enables it to control the speed and torque transmitted to the torque converter, may be had by reference to the copending application of Conrad Hilpert, Ser. No. 187,741, filed Apr. 16, 1962 (now U.S. Patent 3,202,018). It will suffice here simply to observe that interleaved sets of friction discs 25 and 26 respectively splined to the engine flywheel and the torque converter input shaft 28 are urged into engagement by a piston member 29 according to the pressure of hydraulic fluid introduced into an annular chamber 30. The greater the pressure in that chamber, the greater is the frictional engagement of the discs, the less is the slippage of the latter, and the greater is the driven speed of the torque converter input shaft. To control and vary that fluid pressure, a proportional solenoid valve 31 having a coil MC is interposed between the output manifold 32 of a pressure source 34 and the chamber 30, the pressure admitted to the latter being proportional to the excitation current passed through the coil. The pressure source may take the form of a pump 35 continuously driven from the engine 10 and having a pressure regulating valve 36 which vents the pump output to a sump 38. A conduit 39 returns fluid from the chamber 30 to the sump 38 when the coil MC is deenergized thereby to disengage the modulated clutch.

The torque converter may take the form of any one of several known types having a fluid reservoir and rotating vanes for torque transmittal between the converter input shaft 28 and a converter output shaft 40. The output shaft 40 connects with a transmission input shaft 41 through a universal coupling 42.

The multi-ratio transmission 16 may take any one of a variety of specific forms, but in general terms it includes a plurality of clutches engageable in different patterns or combinations to establish selectively any one of a plurality of drive ratios between its input shaft 41 and the output shaft 18. As here shown, the input shaft 41 is formed with an input gear 42 which drives forward and reverse layshafts 44 and 45. Such drive of the forward layshaft occurs directly through a spur gear 46, while drive of the reverse layshaft is through an idler gear 47 to a spur gear 49. The two layshafts are thus respectively driven in opposite directions.

To provide two ratios for forward drive, two gears 50 and 51 are journaled on the layshaft 44 and respectively meshed with gears 52 and 54 rigidly carried on the output shaft 18. Multi-disc clutches 55 and 56 are selectively engageable to connect the gear 50 or the gear 51 to the layshaft 44, thereby to establish first or second forward drive ratios. Similarly, two gears 57 and 59 are journaled on the reverse layshaft, constantly meshed with gears 52 and 54 on the output shaft, and selectively locked to the reverse layshaft by engagement of clutches 60 or 61, respectively, thereby to drive the output shaft 18 in a reverse direction with either of two ratios. Thus, by engaging clutch 55, 56, 60 or 61, the transmission 16 is set to produce first forward, second forward, first reverse, or second reverse drive ratio between the output shaft 40 of the torque converter and the main output shaft 18.

Each of the four transmission clutches is associated with a selectively energizable actuator to control its engagement or release. In the present instance, each such clutch includes a piston 62 movable within a chamber 64 in response to the introduction of pressure fluid so as to compress and drivingly engage the interleaved friction discs 65. The admission of pressure fluid from the source 34 into the four clutches, or the venting of fluid from the clutches back to the sump 38, is controlled by four solenoid valves 66, 67, 69 and 70. Each valve has an actuating coil CF1, CF2, CR1 or CR2 which when energized opens the valve to transmit pressure fluid to the corresponding clutch to engage the latter, and which when de-energized causes the valve to vent the clutch chamber to the sump 38, thereby disengaging that clutch.

In order to sense and generate an operating signal when each of the four clutches is engaged, four pressure-sensitive switches PF1, PF2, PR1, PR2 are employed. As shown in FIG. 1, such switches have normally open contacts 71, 72, 74 and 75 connected to be closed by actuating pistons 76 movable in cylinders 78 coupled to receive the fluid pressure which exists in the conduit leading to one of the four clutches. As each solenoid valve is energized to supply pressure fluid to the corresponding clutch, the associated switch will not be closed unless and until the pressure within that clutch chamber builds up to a predetermined value indicative of full engagement of the clutch.

For braking the output shaft 18 and thereby braking the load, a brake assembly 80 comprising a friction plate 81 is supported on the shaft and a brake shoe assembly 82 is positioned to frictionally engage the plate and shaft. The shoe assembly is actuated by a piston and cylinder assembly 84. The admission of pressure fluid from source 85 is controlled by a solenoid valve 86 which is actuated by movement of an associated brake pedal BR, to cause the brake to engage. The braking pressure source 85 may take the form of a pump 88 continuously driven from the engine 10 and having a pressure regulating valve 89 which vents the pump output to a sump 90. A brake supply line 91 carries the pressure fluid to the valve 86. This separate source is provided to assure that in the event of hydraulic power failure to either the drive train or brake, the other will remain operable. To sense and generate a signal indicative of the operability of the brake system, a pressure sensitive switch BSF having normally open contacts 92 is coupled to receive the fluid pressure which exists in the brake supply line 91.

To simplify the manipulations required to control the direction and drive ratio of the transmission 16, and the engagement of the modulated clutch 13, a control assembly 100 is utilized. A single control member or handle HL grasped by one hand and moved to different positions suffices for all of these functions, as will become apparent from the subsequent description of FIG. 1A.

To select the desired drive ratio for the transmission, the operator simply swings the handle HL and a rod 101 integral therewith laterally or vertically to first, second or third positions defined by an aperture 102 formed in a control plate. This motion is afforded by a gimbel 103 which mounts a sleeve 104 with freedom to be bodily rocked about vertical and horizontal axes, the rod being axially slidable within the sleeve. As the operator swings the handle to the left, right or downward limits of its motion, the sleeve 104 respectively engages and actuates switches SW1, SW2 or N, the contacts of the latter being connected in the circuit of FIG. 2 as hereinafter described.

To afford selection of the direction of drive, the handle HL and rod 101 are rotatable about a longitudinal axis within the sleeve 104. A cam 105, splined to the rod 101 so as to remain axially stationary when the rod is shifted axially, is thus rotated to engage and actuate direction switches SWR and SWF when the handle HL is twisted in counterclockwise or clockwise directions. These switches determine whether the transmission 16 is set to a forward or reverse drive condition, as will be explained below with reference to FIG. 2.

Finally, the control assembly 100 permits the operator to adjust the degree of engagement of the modulated clutch by shifting the handle HL and rod 101 axially in or out. For this purpose, the rod 101 is formed with rack teeth 106 engaged by a pinion 108 connected to drive the wiper 109 of a potentiometer P1. As the handle is moved in or out, the position of the wiper is changed, and this adjusts the engagement of the modulated clutch as is more fully explained below.

Thus, the desired transmission ratio is called for by swinging the control handle HL to any of three positions to actuate one of the switches SW1, SW2 or N. The desired direction of drive through the transmission 16 is called for by twisting the handle HL to the left or right, thereby actuating one of the switches SWR or SWF. And the desired engagement pressure of the modulated clutch is called for by adjusting the control handle HL axially to correspondingly change the setting of the potentiometer wiper 109.

In some instances it may be desirable also to control the modulated clutch by an auxiliary movement, such as positioning a foot pedal CL. This is possible in the present control system simply by connecting the pedal CL to move the wiper P2a of a second potentiometer P2, the latter being electrically connected and utilized as discussed hereinafter.

For a purpose to be explained below, means are provided for sensing and signaling when the output shaft 18 and the load driven thereby is rotating in a given direction and at a speed greater than some predetermined value. For this purpose, the output shaft 18 is coupled through gears 111, 112 to drive speed and direction sensitive switches SSF and SSR. These switches SSF, SSR may be of the centrifugal type and are respectively closed to signal that the shaft 18 is rotating above a first predetermined speed in a forward direction, or above a second predetermined speed in a reverse direction, respectively.

ELECTRICAL CONTROL SYSTEM

Figure 2:
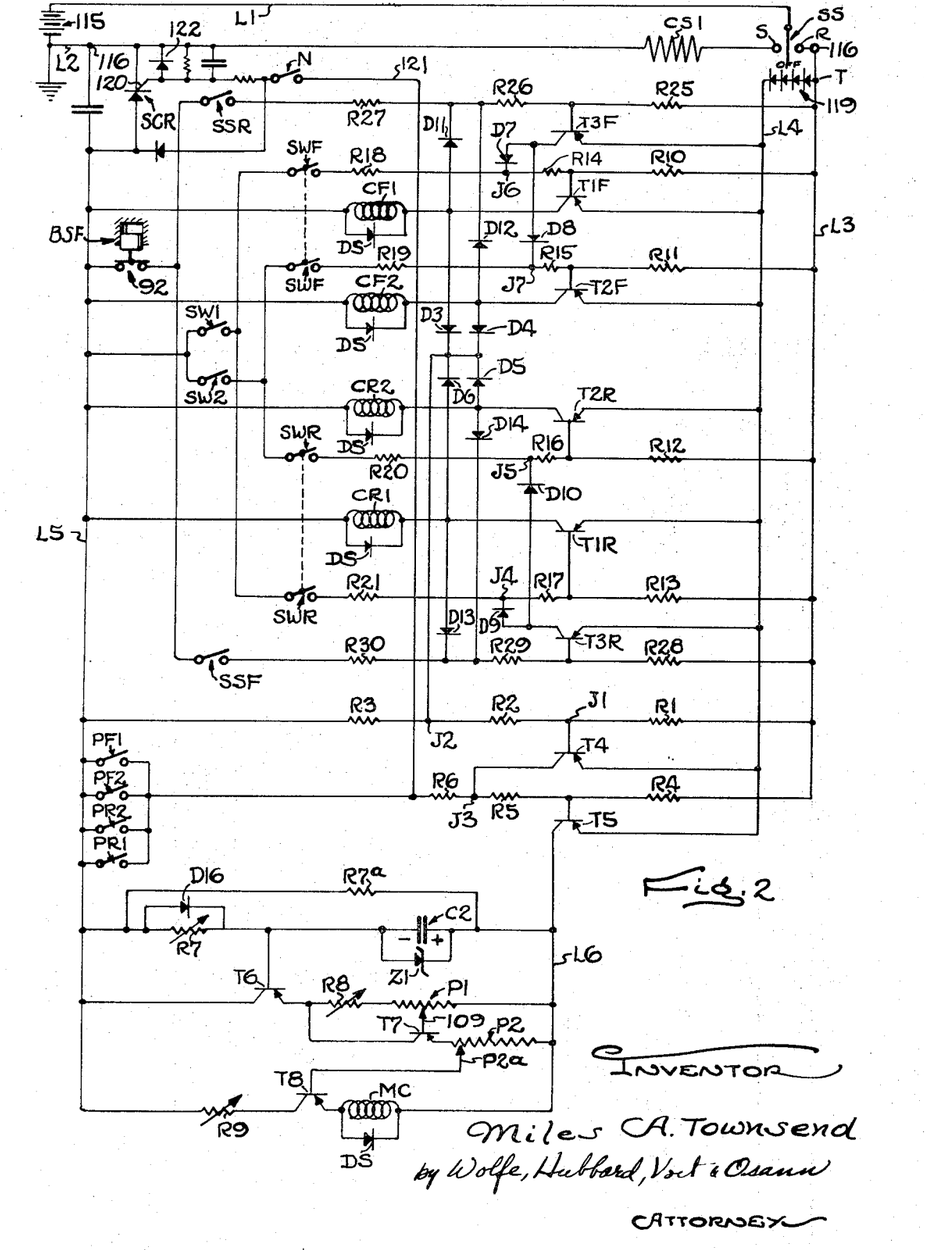
FIG. 2 is a schematic diagram of the electrical control for the system of FIG. 1.

In accordance with the invention, the electrical control of FIG. 2 regulates the power system of FIG. 1 in response to the positioning of the handle HL. The control will generate various signals to actuate the transducers associated with the power system, if it is safe to do so, considering both the operating mode being called for and the operating condition then existing in the system as indicated by the various sensing means heretofore described. If unsafe, the control will delay any change in the condition of the power system until such is permissible, at which time the control sequence will be initiated automatically.

To regulate the power system, and thus control the driven vehicle, the operator need only to start the engine and thereafter manipulate the handle HL to call for the desired direction of drive, the drive ratio, and the degree of engagement of the modulated clutch for regulating the speed. He can also brake the load by depressing the brake pedal DR, and manually engage and disengage the modulated clutch by actuation of the clutch pedal CL.

By way of introduction, it may be noted that the electrical control comprises a voltage source or battery 115 connected to supply lines L1, L2 leading to the control terminals 116. Supply line L1 includes a switch SS having start (S), off, and run (R) contacts or positions. Connecting with the contact R is a supply line L3 with line L4 connected thereto through a bank of series diodes 119. Power line L5 connects with the terminal 116 of line L2 and serves as the control ground conductor.

A. *Engine starting operation*

A primary requisite in the control of a vehicle is the prevention of engine cranking and start-up while the drive system is conditioned to establish a connection from the engine to the output shaft and ground wheels. Starting of the engine while a drive connection is established may lead to abrupt jumping of the vehicle or uncontrolled runaway, with danger of the driver being tossed off. Yet, it is an inconvenience if the starter motor is interlocked so that the control handle HL must be located in its neutral position before cranking and engine starting can occur.

In accordance with one feature of the present invention, the operator may start the engine when the control handle HL is in any position, and yet the drive train to the output shaft will remain incomplete and the vehicle will remain stationary unless and until the control handle is moved, at least momentarily, to its neutral position prior to being set to a drive position. In the embodiment of FIG. 2, means are provided to prevent the energization of any of the electrical actuators or solenoids (and thus assure that all transmission clutches 55, 56, 60 and 61 and the modulated clutch 13 are disengaged) while the engine is being started. As here shown, the three position switch SS selectively connects the battery 115 either to the starter solenoid CS1 through contact S or to line L3 through contact R. So long as the solenoid CS1 is energized to start the engine, the line L3 is disconnected from the battery, and none of the control actuators can be energized.

After the engine has been started, the switch SS is turned to terminal R, thereby connecting line L3 to the voltage source. However, a latching device, here shown as a silicon controlled rectifier SCR, is interposed in the line L5 between the terminal 116 and the control to leave the two unconnected. The latching device SCR is set to a latched state to complete the connection only in response to a momentary input signal, i.e. a positive voltage applied between the gate 120 and cathode. Means are provided to supply such input signal to the SCR only when the control member 100 is located in its neutral position.

This is accomplished by connection of the gate 120 of the SCR through the neutral switch N, conductor 121 and the circuit of resistors R6, R5 and R4 to line L3. Since the SCR will not conduct until a positive voltage is applied to the gate, the circuit from line L5 to the battery 115 will not be completed until the SCR is made conductive. To close switch N, the handle HL must be moved to the neutral position thus assuring that none of the transmission clutches are engaged when the control is energized. Thereafter sufficient current flows through Since the SCR will not conduct until a positive voltage is turned from the R contact. The diode 122 limits the voltage impressed between the gate and cathode of the SCR.

B. *Shifting control*

In accordance with the present invention, the operator by positioning the single control handle HL, may select the desired transmission drive ratio and direction, and the control of FIG. 2 thereafter actuates the proper clutches to carry out the complete shifting operation. The operator may simply shift the control handle from a given position calling for one drive ratio and direction to another position calling for a different drive ratio or direction without pausing to worry about the speed of the vehicle, the danger of being jarred out of the driver's seat, or the possibility of damage to the transmission components. He may also do this without any change in the adjustment of the selected degree of engagement of the modulated clutch.

In all shifting operations, the modulated clutch is first automatically disengaged followed by disengagement of the previously engaged transmission clutch, engagement of the newly selected transmission clutch, and automatic re-engagement of the modulated clutch in that order.

To accomplish these objectives the control includes circuits for selectively energizing the solenoid coils CF1, CF2, CR1 and CR2 by completing current flow paths through control transistors T1F, T2F, T1R and T2R, respectively. All of these control transistors have their emitters connected to an auxiliary voltage supply line L4, their bases connected to an associated resistive voltage divider, and their collectors connected through the corresponding coil to the line L5. The line L4 is held at a voltage level slightly less positive than the line L5 by voltage dropping means here shown as the four series diodes 119 interconnecting the two. By way of example for purposes of discussion, the forward voltage drop through these diodes makes the line L4 reside at a potential of about +24 volts (relative to line L5), assuming that the line L3 has a potential of about +28 volts.

Considering the transistor T1F by way of example, when the switch SWF (or the switch SW1) is open, no current flows through the associated voltage dividing circuit including resistors R10, R14, R18, and the emitter-base junction of the transistor is reversely biased so that its emitter-collector path is non-conductive and the coil CF1 is deenergized so the clutch 56 is disengaged. When both switches SW1 and SWF are closed (by positioning of the control handle HL, FIG. 1), this voltage divider circuit is connected between lines L3 and L5, and the resistors are so sized that the voltage drop across resistor R10 is about five volts, making the transistor base reside at about +23 volts potential. This creates a forward bias across the emitter-base junction of the transistor T1F to turn the latter fully on, and exciting current flows through its emitter-collector path and the coil CF1. As a result, the valve 66 (FIG. 1) is actuated, pressure fluid supplied to the clutch 56, and the latter is engaged to set the transmission in its first forward drive ratio. It will be apparent that this occurs only when the control handle HL (FIG. 1) is shifted laterally to the left and rotated clockwise so that both the switches SW1 and SWF are closed.

In like manner, the transistor T2F is turned on or off by a voltage divider circuit including resistors R11, R15, R19 which is excited only when switches SWF and SW2 are closed; the transistor T1R is turned on or off by a voltage divider circuit including resistors R13, R17, R21 only when switches SWR and SW1 are closed; and the transistor T2R is turned on or off by a voltage divider circuit which is excited only when switches SWR and SW2 are closed. Thus, the transmission 16 is set for drive in a direction and with a ratio which is determined by the position of the handle HL in FIG. 1. It will be seen that the switch SWF with its plural contacts controls a first family of circuits for all forward drive ratios, i.e., neither the coil C1F nor the coil C2F can be energized unless switch SWF is actuated. Similarly, the switch SWR controls a second family of circuits for all of the reverse drive ratios. By contrast, switches SW1 and SW2 control the drive ratio (first or second) which is to be established, without regard to the direction of the drive.

When the handle HL is moved to its neutral position, neither the switch SW1 nor the switch SW2 is actuated, and thus none of the coils CF1, CF2, CR2, CR1 is energized. The transmission 16 is thus set to a neutral condition with no drive therethrough. Although the switch N closes to apply a positive voltage to the gate of the SCR, this does not adversely affect the latter if it has already been fired and latched in its conductive state.

When the handle HL is shifted from any selected position toward a different position, the previously excited coil C1F, C2F, C1R or C2R is immediately de-energized, and all such coils remain de-energized at least until the handle reaches its new position.

C. *Modulated clutch control*

In order to engage the modulated clutch 13 and adjust its degree of engagement, the valve coil MC is connected such that it normally receives a predetermined excitation current, and so that the valve 31 supplies a corresponding pressure to the clutch chamber 30 (FIG. 1). As shown in FIG. 2, a transistor T5 has its emitter and collector respectively connected to line L4 and line L6 and when this transistor is turned on, the line L6 will reside at approximately +24 volts potential. Under these conditions, a capacitor C2 will be charged with the indicated polarity and to a voltage limited by the breakdown value of a Zener diode Z1. Thus, a forward voltage bias is applied to the emitter-base junction of a transistor T6 connected as an emitter follower with a rheostat R8 and the potentiometer P1 as load resistors in its emitter circuit. The potential appearing on the wiper 109 of the potentiometer P1 is thus proportional to the voltage across the capacitor C2 with the position of the wiper 109 determining the factor of proportionality.

A second transistor T7 is connected as an emitter-follower responsive to the potential on the wiper 109, with the pedal-control potentiometer P2 as an emitter load. The potential of the wiper P2a is thus proportional to the voltage appearing on the wiper 109, the factor of proportionality being determined by the setting of the wiper P2a.

The wiper P2a is connected to the base of a transistor T8 which has its emitter-collector terminals connected in series through the coil MC and a rheostat R9 across the lines L6, L5. Since current flow through the transistor T8 is proportional to forward bias across its emitter-base junction, the coil MC receives steady-state exciting current proportional to the combined settings of the current regulators or potentiometers P1 and P2, assuming that the transistor T5 is turned on and that the capacitor C2 is charged to the maximum voltage permitted by the Zener diode Z1.

In accordance with one feature of the invention, the modulated clutch is automatically disengaged when the control member or handle HL is shifted from one position toward another to change the condition of the transmission clutches. For this purpose a transistor T4 is controlled according to the potential at the junction J1 of a voltage divider circuit including three resistors R1, R2, R3 connected in series between the lines L4 and L5. The potential of that junction normally places a forward bias on the emitter-base junction of the transistor T4, and the latter would normally be fully conductive. It is however, turned off by means to be described below.

The transistor T5 is associated with a voltage divider circuit including resistors R4, R5, R6 connected in series between lines L3 and L5 through a parallel combination of the clutch-engagement sensing switches PF1, PF2, PR2, PR1. Assuming that one of the latter switches is closed, the voltage drop across resistor R4 places a positive bias on the emitter-base junction of the transistor T5, and the latter is turned on so that the modulated clutch actuator coil MC may be excited as described above.

In order to automatically disengage the modulated clutch 13 when the control handle HL is moved away from any selected position, means are employed to signal when any transmission clutch coil CF1, CF2, CR1, CR2 is excited and to permit completion of the circuit for the coil MC only under those conditions. Conversely, such means function to interrupt the circuit for the coil MC, and thus to disengage the modulated clutch when none of the transmission clutch coils is excited. For this purpose in the exemplary embodiment, the collectors of the transistors T1F, T2F, T1R, T2R, (and thus the right ends of the coils C1F, C2F, C1R, C2R) are connected by diodes D3, D4, D5 and D6 to the junction J2 between resistors R2 and R3. Whenever any one of the transistors T1F, T2F, T1R, T2R is turned on, the junction J2 is clamped to approximately a +24 volt potential. This, in turn, reduces the current flow through and the voltage drop across the resistor R1, so that a reverse bias is applied to the emitter-base junction of the transistor T4 and the latter is turned off. Under these circumstances, and assuming one of the engagement-sensing switches is closed, transistor T5 is turned on.

When, however, the control handle is moved away from a given control position, none of the transistors T1F, T2F, T1R, T2R will be conductive. The junction J2 will no longer be held at a +24 volt potential, and the transistor T4 will be rendered conductive. Its collector is connected to the junction J3 between resistors R5 and R6, clamping that point to a +24 volt potential. This reduces the voltage drop across the resistor R4, and so imposes a reverse bias on the emitter-base junction of the transistor T5, turning the latter off. With this, no current can flow through the coil MC, and the modulated clutch is quickly released.

Thus the modulated clutch is automatically and quickly disengaged immediately upon initiation of any shifting sequence by the operator moving the handle HL, and the operator need concern himself only with the selection of the new drive ratio. This disengagement occurs immediately upon the opening of the circuits controlling the transmission clutch engagement to thereafter hold the modulated clutch disengaged.

In accordance with another aspect of the modulated clutch control, the modulated clutch is also automatically re-engaged, but only after the selected transmission clutch is engaged. For this purpose the parallel combination of transmission clutch-engagement sensing switches PF1, PF2, PR1, and PR2 are connected in series with the voltage divider circuit of R4, R5 and R6 associated with transistor T5. Since the transistor T5 can only become conductive when this voltage divider circuit is completed, one of these switches must be closed before the modulated clutch is engaged.

Assuming the operator shifts to the first forward drive ratio, by closing switches SW1 and SWF, conduction occurs through coil CF1 to open valve 66 (see FIG. 1) thus engaging clutch 56. Thereafter the pressure sensing switch PF1 is actuated closing contacts 71 and signaling full engagement of the transmission clutch 56. Since transistor T4 is already clamped off by conduction through the transistor T1F and diode D3 as heretofore described, this completes the voltage divider circuit of R4, R5, and R6 to permit transistor T5 to conduct. The modulated clutch is thereafter re-engaged to the degree set prior to initiation of the shifting sequence without further action by the operator.

By requiring that the transmission clutch pressure switch must be actuated prior to engagement of the modulated clutch, it is the modulated clutch which completes the driving connection between the vehicle tracks and the engine. The transmission clutches need only be constructed to withstand the lesser strain and wear accompanying the connection of the output shaft 18 and the transmission and torque converter components.

Still another feature of this invention involves the lessening of the jolt and wear accompanying the engagement of the drive train by always automatically engaging the modulated clutch slowly. After transistor T5 is turned on, the voltage build-up across the modulated clutch coil MC is gradual according to an almost linear time variation, and the modulated clutch thus gradually engages. For this purpose, the timing circuit comprising the resistor R7 and capacitor C2 is connected to control the base voltage of transistor T6. When T5 becomes conductive to give the line L6 a +24 volt potential relative to the line L5, the capacitor C2 charges by current flow through rheostat R7. The voltage rise across the capacitor C2 is exponential but substantially linear, the rate or slope being determined by the value of the resistor R7. The voltage rise of the base of transistor T6 follows the voltage rise across the capacitor C2, thereby gradually increasing the current flow through the transistor and the potentiometer P1. A Zener diode Z1 limits the maximum voltage across the capacitor C2. As the voltage across potentiometer P1 increases with the increase in current flow, the base voltage of transistor T7 increases to make it more conductive. Conduction through transistor T7 and the voltage across P2 follow the same voltage build-up pattern to gradually raise the base voltage and turn on transistor T8 and energize coil MC to the preset value. Thus, the current flow through coil MC gradually increases to the predetermined value each time the transistor T5 is turned on, and the modulated clutch is gradually engaged until its plates are pressed together with a predetermined force. The value of the predetermined current and the predetermined force may be selected or adjusted by changing the setting of the potentiometer P1 or P2.

The modulated clutch is thereby always engaged slowly to lessen the wear and jolting of the vehicle and drive train which usually accompanies the completion of a driving connection between an engine and load. The rate of engagement may be adjusted by regulation of the resistance value of R7, and the maximum degree of engagement is adjustable by movement of either pedal CL or handle HL to move the wipers P2a, 109, respectively, as heretofore explained.

It is equally important that disengagement of the modulated clutch occur quickly. For this purpose, means are provided to discharge the capacitor C2 with a time constant considerably lower than that with which it is charged. As here shown, a discharge circuit for rapidly dropping the voltage across C2 is provided to effect a similar drop in voltage across the coil MC. This discharge circuit comprises a resistor R7a connected across the series combination of the resistor R7 and the capacitor C2, and a diode D16 connected across the resistor R7. The diode D16 in effect removes the resistor R7 from the discharge circuit, and the value of the resistor R7a is preferably considerably less than that of the resistor R7. When T5 is turned off to disconnect the modulated clutch, the capacitor C2 quickly discharges by current flow through the circuit including resistor R7a and diode D16 to immediately drop the voltage across the capacitor, followed by an immediate deenergization of coil MC since this results in the rapid turn off of the transistors T6, T7 and T8.

The shifting sequence therefore occurs upon initial movement of the handle HL to thus prepare the drive train for shifting into a new drive ratio with little slow down of the vehicle. In other words, when the handle HL is initially moved, the modulated clutch is immediately disengaged to disconnect the drive chain. The presently engaged transmission clutches are disengaged and the newly selected transmission clutches are engaged while the drive chain is still disconnected. Lastly, and without any further action on the part of the operator, the modulated clutch is gradually re-engaged to drive the vehicle in the newly selected drive ratio. This complete shifting sequence is initiated by the operator moving the handle HL with one hand, from the old to the new drive ratio selection.

D. *Shifting inhibit control*

In accordance with another feature of the invention, the operator may shift from any drive ratio to any other drive ratio, whether forward or reverse, without concern about the speed or direction with which the vehicle is then moving. However, if the shift involves a change in the direction of drive, that is, if the new drive direction selected is opposite to that in which the load is then moving, the control inhibits the actual shifting until the speed of the vehicle slows to a safe predetermined speed, at which time the control effects the shifting. If the vehicle is proceeding forward and the transmission were suddenly shifted into reverse, severe shock to the components and discomfort to the operator would result. Possibly the shock would be so severe as to damage the drive train, depending upon the speeds involved, but at the very least the drive train would be subjected to undue strain or wear.

To accomplish the objective of preventing this shock to the drive train and operator, means are provided to prevent or inhibit shifting to a drive direction opposite to that in which the output shaft is rotating. For this purpose, the normally open direction switch SSF or SSR is actuated and closed when the output shaft 18 is turning above a given speed in a forward or reverse direction, respectively. Assuming switch 92 (FIG. 2) is closed, switch SSF when closed completes a voltage divider circuit including the resistors R28, R29 and R30 between the power lines L3 and L5, while switch SSR similarly completes a voltage divider circuit of resistors R25, R26 and R27. The voltage divider circuits associated with switches SSF and SSR controls the base voltage of auxiliary control transistors T3R and T3F, respectively.

To prevent shifting into a reverse direction drive when switch SSF is closed to indicate the output shaft, and therefore the ground wheels, is turning to go forward, the energization of the reverse drive clutch coils CR1 and CR2 is prevented. Transistor T3R includes an emitter connected to line L4 with the collector connected through diodes D9 and D10 to junctions J4 and J5, respectively. When conduction occurs through the voltage divider circuit of resistors R28, R29, R30, the voltage drop across resistor R28 impresses a forward bias on the emitter-base junction of transistor T3R. With the resulting conduction through transistor T3R, the voltage of junctions J4 and J5 is raised to approximately +24 volts making the base voltages of transistor T1R and T2R approximately +26 volts since the voltage gradient to the line L3 at 28 volts is divided across corresponding resistors R13, R17 and R12, R16, respectively. A reverse bias is thereby impressed across transistors T1R, T2R preventing conduction and any energization of coils CR1, CR2 which would shift the transmission to a reverse drive direction. Thus, so long as the switch SSF is closed indicating that the output shaft 18 is turning above a predetermined speed in a forward direction, the transmission clutches cannot be engaged to establish a reverse drive.

Similarly, when SSR is closed indicating the output shaft 18 is turning in reverse direction and above a predetermined speed, transistor T3F conducts to raise the voltage of junctions J6 and J7 through the circuits including diodes D7 and D8 and clamp off both the transistors T1F and T2F, thereby preventing the transmission from being set to a forward drive condition.

Shifting to a drive direction opposite to the direction the vehicle is then moving is thus inhibited until the vehicle slows to a speed allowing the corresponding switch SSF or SSR to open. These switches may be of the type to close after a predetermined speed is reached, or of the type which close on any motion in the given direction, in which case the predetermined speed is zero. The value of the predetermined speed is chosen according to the amount of shock which the drive chain can safely accept without excessive strain or destruction.

E. *Rollback shifting control*

When the vehicle is being driven forwardly uphill, the present invention enables the operator to let the vehicle roll back, and thereafter proceed back up the hill. Frequently in such an operation, the operator after driving forwardly up a slope may disengage or slip the modulated clutch, with the transmission left in its original forward drive condition, to allow rollback of the vehicle. By subsequent engagement of the modulated clutch, the rollback motion is terminated and the vehicle again proceeds uphill. This saves both time and brake wear.

The inhibit control heretofore described, functions to protect the power system by preventing engagement of the drive chain when the output shaft is turning in a direction opposite to the drive direction selected. It is the purpose of this rollback shifting control to enable the operator to perform such an operation where the operator knows the power system will not be damaged since the vehicle speed is low resulting in less strain on the drive chain. Quite frequently, especially in earth moving vehicles, repeated back and forth drive motions must be executed. One instance is while pushing earth up on an existing earth pile. This inhibit control enables the operator to drive uphill and disengage the modulated clutch to roll back, then re-engage the modulated clutch to stop the backward movement and again drive uphill without moving the handle HL to shift the transmission drive ratio.

To permit such operation, means are provided for disabling the inhibit control just described so long as the transmission drive ratio remains unchanged. For this purpose, the circuit of FIG. 2 includes diodes D11 and D12 connected to transfer the collector voltages of the clutch control transistors T1F and T2F to the base voltage control circuit of the auxiliary inhibit control transistor T3F. With conduction through either of the control transistors T1F, T2F indicating forward drive of the vehicle, the associated inhibit transistor T3F is clamped off by the voltage potential of the line L4 being impressed to raise the base voltage above cutoff. Similarly, with conduction through either of the control transistors T1R, T2R the associated inhibit transistor T3R is clamped off by the conduction of the line L4 voltage potential through the circuit including diodes D13 and D14. By this arrangement, so long as a shifting sequence is not initiated, the inhibit control is disabled to allow the rollback operation just described. Once the vehicle is moving to close a direction switch SSF or SSR, and a drive ratio shifting is initiated, the inhibit control functions since all the control transistors T1F, T2F, T1R and T2R turn off and thus remove the back biasing voltage on the transistors T3R, T3F.

By way of example, assume the control has been set to shift the transmission to the second forward drive ratio, i.e., transistor T2F is conducting to energize coil CF2. Through the circuit of diode D12 the voltage at the junction of resistors R26, R27 is raised to the potential of line L4, i.e., +24 volts according to the example stated above. By raising the potential of this junction, the voltage drop across the resistor R25 is reduced to make the base of transistor T3F have a potential of about +26 volts despite the fact that the direction sensing switch SSR is closed as the vehicle rolls back in a reverse direction. The transistor T3F is thus turned off even though switch SSR closes as the load rolls back due to disengagement of the modulated clutch, thereby rotating the output shaft 18 in the reverse direction. Because transistor T3F is held non-conductive, it cannot turn off the transistor T2F and deenergize the coil CF2. Re-engagement of the modulated clutch will allow the load to again be driven in this second forward drive ratio. However, if the operator shifts the handle HL from the "second forward" position toward any other position, the switch SWF or SW2 will open, thereby turning transistor T2F off, so that the diode D12 no longer holds transistor T3F off, and the latter will conduct to inhibit re-shifting into any forward drive ratio so long as the reverse sensing switch SSR is closed. The other transmission clutch control transistors T1F, T1R, and T2R with their associated diodes D11, D13 and D14 function, when energized, in the same manner to clamp off the associated inhibit circuit transistor.

F. Brake failure safety control

Under certain circumstances it may be advantageous to shift to a drive direction opposite to the direction of drive of the load, even though this may result in more than the normal stress and wear on the drive train. One example of these situations is that created by failure of the brake system. For instance, if the vehicle is being driven downhill in a forward direction, failure of the brakes may result in runaway of the vehicle; the driver being unable to shift into a reverse drive condition due to the inhibit feature described above. If the driver shifts to neutral, the vehicle will only roll all the faster, and the inhibit control will not let the transmission be shifted into reverse so long as the switch SSF is closed. In accordance with the invention, means are provided to sense failure of the brake system and under that condition to disable the inhibit control, so the operator can shift the transmission to a drive direction opposing the direction the vehicle is traveling.

To accomplish this, the switch BSF is associated with the brake system pressure line to be normally closed when the brake fluid in the line is maintained at a sufficient pressure for proper operation of the brakes. This switch is connected in the inhibit control circuits associated with direction switches SSF and SSR. If the brake fluid pressure falls below a safe brake operating level, switch 92 opens to prevent turn-on of the inhibit transistors T3F or T3R even though the speed sensing switch SSR or SSF closes. With the inhibit circuits thus disabled, the operator may move the control handle into a reverse drive position and the transmission will be shifted to a drive direction opposite to the present direction of travel to slow and stop the vehicle.

SECOND EMBODIMENT

Figures 3, 3A:
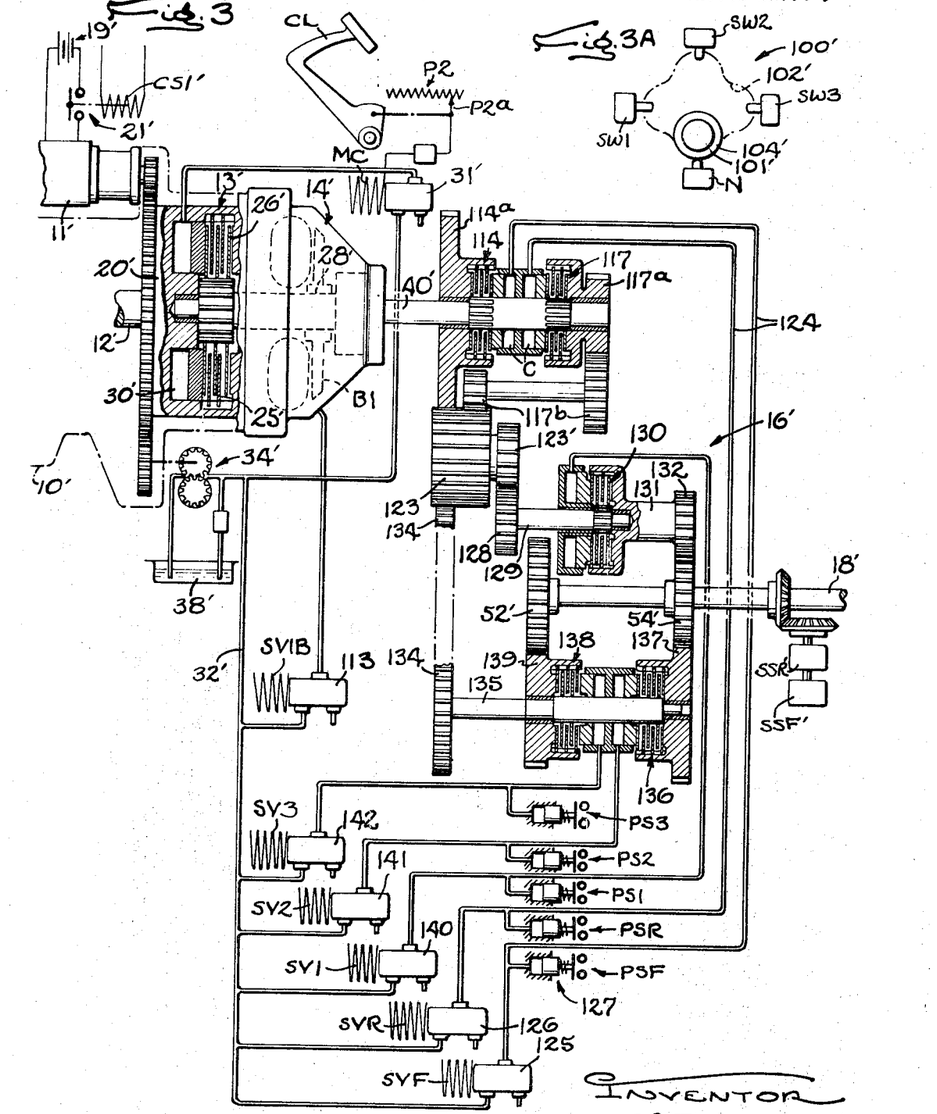
FIG. 3 is similar to FIG. 2 but illustrates a modified embodiment of the power drive system.
FIG. 3A is a partial diagrammatic representation of an exemplary control assembly similar to that of FIG. 1A which may be manipulated by an operator to selectively set the drive conditions of the power system of FIG. 3.
Figure 4:
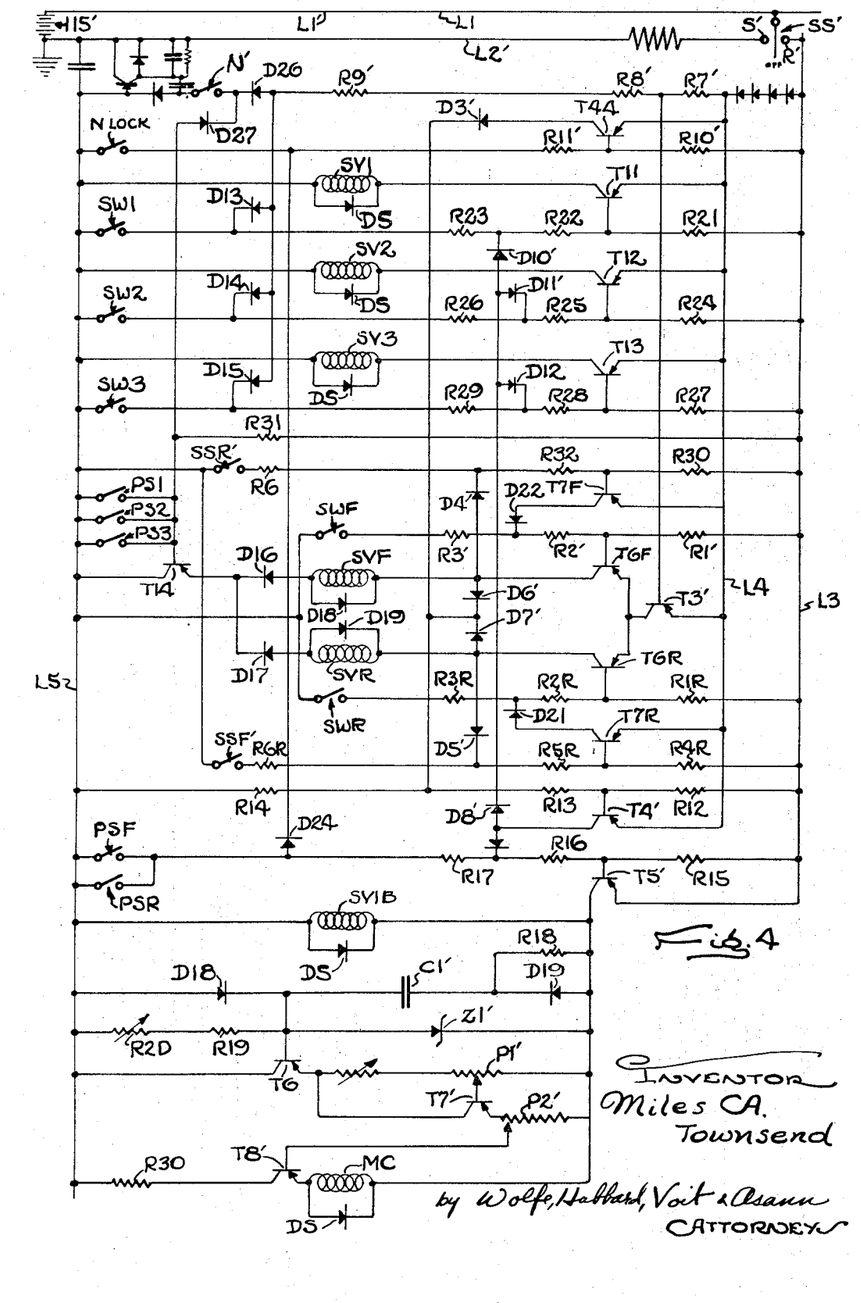
FIG. 4 is a schematic diagram of the electrical control for the system of FIG. 3.

In FIGS. 3A and 4, a second embodiment of the invention is shown for the power system of FIG. 3 which differs from the first embodiment power system primarily in the number of transmission drive ratios, thereby requiring that the control system supply different control signals for shifting the transmission. To the extent feasible, components similar to those described above with references to FIGS. 1, 1A and 2 are identified by the same reference characters in FIGS. 3, 3A and 4, but with the distinguishing prime symbols added.

In FIG. 3, a power system for driving a load (not shown) is illustrated as comprising a prime mover 10' connected to a drive train including a clutch 13', a torque converter 14', and a multi-ratio, reversible transmission 16' adapted to drive a load through an output shaft 18'. As in the first embodiment, the clutch 13' is a modulated clutch having an input member 20' with friction plates 25' which may be engaged for constant slippage with plates 26' connected to the shaft 28'. The torque converter 14', as before described, functions to cushion the shock inherent in connecting and disconnecting the load to the engine. In this instance, a brake B1 acts within the converter to stop rotation of the output shaft 40' when the drive train is disengaged to lessen the inertial forces transferred to the transmission clutches when they are subsequently engaged. Although the specific details of the brake are not shown, it will suffice to note here that the brake is normally engaged and it is disengaged in response to energization of a coil SV1B to open a valve 113 and admit pressure fluid to the brake.

As in the prior embodiment, the transmission 16' permits selection of the direction and the ratio of drive connection between the torque converter shaft 40' and the output shaft 18'. In this instance forward and reverse drive gear trains are in series drive connection with three drive ratio gear trains, making it possible to drive the output shaft in forward or reverse direction with any one of three drive ratios.

Specifically, the transmission 16' connects with shaft 40' through a forward drive clutch 114 forming a driving connection with an input gear 114a and a reverse drive clutch 117 forming a driving connection with an input gear 117a. For forward drive, clutch 114 is engaged to drive a compound idler gear 123 directly from the shaft 40' through the input gear 114a. For reverse drive, clutch 117 is engaged to drive the gear 117a which, through intermediate reversing gears 117b supported on a layshaft, drives the idler gear 123 in the opposite direction. To engage the clutches, pressure fluid is supplied to their cavities C through pressure lines 124 from a pressurized fluid supply 32', with the flow to clutch 114 being controlled by valve 125 actuated by the energization of solenoid coil SVF, and the flow to clutch 117 being controlled by valve 126 actuated by solenoid coil SVR. Pressure switches PSF and PSR are closed by action of the cylinder and piston assemblies 127 to signal the complete engagement of the associated clutches 114 and 117, respectively.

Three parallel clutch-gear trains connect the idler gear 123 to the output gears 52' and 54' attached to output shaft 18'. These are selectively completed to establish first, second and third drive ratios. The first such drive train includes an intermediate gear 128 meshing with idler gear 123' and in driving connection with a layshaft 129, a clutch 130, a shaft 131, and a gear 132 meshing with the output gear 54'. The second drive train includes an intermediate gear 134 meshing with an idler gear 123 and driving a layshaft 135, a clutch 136, and a gear 137 in driving engagement with the output gear 54'. The third drive train includes a gear 134, layshaft 135, a clutch 138, and a gear 139 in driving engagement with the output gear 52'.

The clutches 130, 136 and 138 are engaged by the introduction of pressure fluid into cavities C from the supply 32', with the flow of pressure fluid being controlled by valves 140, 141 and 142 actuated by the energization of solenoid coils SV1, SV2 and SV3 respectively, to complete the first, second or third transmission drive ratio. In addition, the pressure fluid supplied to each clutch acts through an associated cylinder and piston assembly 127 to close a pressure switch PS1, PS2 or PS3, thus indicating establishment by the clutches of the first, second or third drive ratios respectively.

In this embodiment of the invention, the control of FIG. 4 is adapted for overall regulation of the power system of FIG. 3 in response to an operator manipulating a control assembly 100' similar to control assembly 100 of FIG. 1. This control assembly 100' differs only in the inclusion of a neutral and first, second and third drive ratio switches N, SW1, SW2, SW3, which as shown in FIG. 3A, are respectively actuated when the handle (not shown in FIG. 3A) and the sleeve 104' are moved to four respective positions within the limits of the aperture 102'.

As in the previously described embodiment, the modulated clutch is constructed to endure the shock imposed on it as the last element to engage or the first to disengage when the drive train connects or disconnects the prime mover and the load. All transmission shifting operations are preceded by automatic disengagement of the modulated clutch and transmission clutches. Engagement of the newly selected drive ratio clutch 130, 136 or 138, engagement of the selected drive direction clutch 114 or 117, and slow engagement of the modulated clutch 13' follows. For this purpose the control of FIG. 4 incorporates the electrical actuating coils heretofore described in FIG. 3 and coordinates their energization in response to the control signals generated by manipulation of the control assembly 100'. As previously described in connection with the first embodiment control, supply lines L1' and L2' are connected to a suitable voltage source or battery 115', with the switch SS' serving to connect the prime mover starter 11', and thereafter the remainder of the control to these lines. Energization of the ratio clutch solenoids SV1, SV2 and SV3 is dependent upon conduction through transistors T11, T12, and T13 respectively, with the base circuit potentials of these transistors being controlled by actuation of the drive ratio switches SW1, SW2 and SW3.

To shift the transmission 16' into forward or reverse drive, the energization of solenoid coils SVF and SVR is controlled by transistors T6F and T6R. A transistor T3' interposed in the circuits for both transistors T6F and T6R, is conductive only after one of the ratio-selecting switches SW1, SW2, SW3 is closed to lower the base potential by the voltage drop across a resistor R7'. Conduction through both of these circuits also depends upon conduction through a transistor T14 which occurs only when one of the pressure switches PS1, PS2 or PS3, or the neutral switch N', is closed to create a voltage drop across a resistor R31. This assures that the selected ratio clutch is engaged before either of the direction clutches may be engaged, unless the neutral switch is closed. By closing the neutral switch N', the direction clutches may be individually engaged as might be necessary in driving reversible power take-off apparatus from the idler gear 123'. While in this embodiment the selected ratio clutch and direction clutch are engaged sequentially in that order, these clutches could be engaged in the reverse order with equal results.

The regulation of the modulated clutch, as controlled by the modulated clutch control circuit including transistor T5', is essentially the same as in the first embodiment, with the addition of the brake valve solenoid coil SV1B and the associated inductive surge prevention diode DS. The torque converter brake is spring applied and thereby stops the converter output shaft 40' when coil SV1B is deenergized. This converter brake is applied only when the modulated clutch control circuit is deenergized to disengage the modulated clutch.

For a better understanding of the operation, assume the operator manipulates the control assembly 100' to call for shifting the transmission from forward-first-ratio drive to reverse-second-ratio drive by opening the switches SW1 and SWF and by the closing of switches SW2 and SWR. Upon initial movement of the handle HL', the switches SW1 and SWF open to turn off transistors T11 and T6F, thereby deenergizing solenoids SV1 and SVF. Moreover, with switches SW1, SW2, SW3 now all opened, current flow through resistors R7', R8' is interrupted, thereby applying a reverse bias to the emitter-base junction of transistor T3'. Thus, the previously energized ratio and direction selecting solenoids are deenergized.

If only the direction control switch is opened, only the direction control transistors T6F and T6R are made nonconductive to disengage these direction clutches and the engaged ratio clutch is left unchanged. In either case the clamping voltage to the base circuit of transistor T4' through diode D6' or D7' is interrupted to allow transistor T4' to conduct, thereby to turn off transistor T5' and thus quickly disengage the modulated clutch. When switch SW2 thereafter closes, transistor T12 conducts to energize coil SV2 and engage clutch 136 (see FIG. 3). Only when the selected clutch 136 is fully engaged, the switch PS2 closes to make transistor T14 conductive and permit transistor T6R to turn on in response to the closure of switch SWR. This energizes coil SVR, engages clutch 117, the switch PSR closing when such engagement is complete. With the conduction of T6R, T4' is returned to its normally off condition; and with the closing of switch PSR, the transistor T5' is again rendered conductive. The capacitor C1' exponentially charges to gradually engage the modulated clutch through energization of coil MC, as previously described.

In any shifting operation, either transistor T3' or a direction control transistor T6F or T6R is turned off. For example, in shifting from one drive ratio to another without any change in drive direction, transistor T3' is shut off since all drive ratio switches SW1, SW2, SW3 are momentarily opened to interrupt current through resistors R7' and R8'. Additionally, the drive ratio transistors T11, T12, T13 are all momentarily shut off to allow T4' to conduct and clamp off T5' to disengage the modulated clutch. On the other hand, when a change in direction but not drive ratio is called for by movement of the control shaft 101', T6F and T6R are turned off, T4' conducts to clamp T5' off and disengage the modulated clutch. In a ratio shift only, transistors T6F and T6R are turned off since all of the drive ratio switches SW1, SW2 and SW3 are opened to turn off T3', thus opening the direction solenoid circuits. In all instances, the modulated clutch 13' is thus disengaged, the selected drive ratio clutch is engaged, the selected direction clutch is engaged and the modulated clutch re-engaged, in that order. An N-lock switch is connected in series with voltage dividing resistors R10', R11' associated with a transistor T44. Closure of that switch causes T44 to conduct, and connection from the latter through a diode D3' turns off transistor T4'. This results in engagement of the modulated clutch without engagement of any of the ratio or direction clutches. Such engagement may be desirable for testing or other purposes.

Additionally, the inhibit function of this embodiment is performed by the transistors T7F and T7R controlled by speed and direction-sensing switches SSR' and SSF'. This circuit functions as before described except that it need only inhibit conduct of the appropriate direction control transistor. When a direction switch SSF' or SSR' is closed, the transistors T7R, T7F are connected to impress a clamping voltage on the base circuit of the appropriate direction control transistor T6R or T6F through diodes D21 and D22, respectively. So long as the output shaft is rotating above a predetermined speed in one direction, the transmission 16' cannot be conditioned to drive the output shaft in the opposite direction.

The rollback shifting control is provided by connecting the forward and reverse direction transistors T6F, T6R to the voltage dividers associated with inhibit transistors T7F, T7R through the circuits of diodes D4' and D5'. For example, with the transmission in a forward drive condition, the diode D4' impresses a reverse bias voltage on the base of transistor T7F to maintain the transistor non-conductive so that rollback may be effected even though switch SCR' is closed. The circuit of diode D5' disables the inhibit circuit including switch SSF' and transistor T7R in the same manner. These inhibit transistors T7F and T7R can only become conductive if a shifting sequence is initiated during a rollback operation.

I claim as my invention:

1. In a system for driving a load from a prime mover, the combination comprising a modulated clutch and a multi-drive ratio transmission adapted to be drivingly interposed in tandem between the prime mover and an output shaft connected to the load, said transmission having means including a plurality of clutches engageable to selectively establish any one of a plurality of forward and reverse drive ratios, a plurality of electrical actuators each adapted for engaging respective ones of said clutches in response to being energized, a family of electrical circuits connected for selectively energizing said actuators, first control means for shifting said transmission by selectively energizing respective ones of said family of circuits, a modulating electrical actuator for engaging the modulated clutch when energized and to a degree proportional to the current flow through the actuator, second control means responsive to each shifting operation of said first control means for stopping current flow to said modulating actuator, said second control means also including means for initiating and gradually increasing current flow up to a predetermined amount to said modulating actuator in response to a drive ratio being established in said transmission, means for sensing and signaling when said output shaft is turning in a given direction and at a speed greater than a predetermined value, and means responsive to signaling by said sensing means for preventing energizing of those circuits for shifting the transmission to a drive direction opposite to the direction the shaft is turning.

2. In a system for driving a load from a prime mover, the combination comprising, means including a modulated clutch and a multi-ratio transmission adapted to be drivingly interposed in tandem between the prime mover and the load, said transmission having a plurality of clutches engageable in different patterns to provide a plurality of drive ratios, a control member selectively movable to a plurality of positions, means including a plurality of actuators for engaging respective ones of said clutches in response to being energized, means responsive to movement of said control member into different ones of its positions for energizing respective combinations of said actuators and thus setting said transmission in a corresponding one of its drive ratios, means including a modulating electrical actuator for engaging said modulated clutch to a degree substantially proportional to the current flow through such actuator, a control circuit for supplying a predetermined current through said modulating electrical actuator including means for slowly increasing current flow therethrough up to a predetermined value, means responsive to movement of said control member away from any of said positions for interrupting said control circuit and disengaging said modulated clutch, means responsive to the location of said control member in any one of said positions for reestablishing said control circuit and slowly increasing the current flow therethrough to the predetermined value, whereby said modulated clutch is automatically disengaged and slowly re-engaged as an incident to shifting of the transmission from one drive ratio to another.

3. In a system for driving a load from a prime mover through a modulated clutch connected in tandem with a multi-ratio transmission which may be set to a neutral position, the combination comprising an electrical control system having a pair of terminals adapted for connection to a voltage source and a pair of supply lines, latching means set to a latched state in response to a momentary input signal for connecting said supply lines to said terminals, said control system including a plurality of electrical clutch actuators, and means responsive to energization of different combinations of said clutch actuators for placing said transmission in different respective ones of its drive ratios and for placing said transmission in its neutral position when none of the actuators is energized, a modulating electrical actuator for engaging the modulated clutch when energized and to a degree proportional to the current flow through the actuator, a control member selectively movable to a plurality of control positions each corresponding to one of said drive ratios and to a neutral position, means for energizing a particular combination of said clutch actuators from the voltage between said supply lines in response to said control member being located in a corresponding one of said control positions and for deenergizing all such actuators in response to location of the control member in said neutral position, means for energizing said modulating actuator from the voltage between said supply lines in response to a combination of said clutch actuators being energized and for deenergizing said modulating actuator in response to said control member being moved away from any of said control positions, means for starting said prime mover, means for supplying an input signal to said latching means to set the latter in its latched state when the control member is in said neutral position, and means for resetting said latching means to its unlatched state in response to operation of said starting means, whereby said prime mover may be started when the control member is in any position, but no drive of the load occurs until the control member is thereafter moved at least momentarily to its neutral position.

4. In a system for driving a load from a prime mover, the combination comprising a modulated clutch and a multi-ratio transmission adapted to be drivingly interposed in tandem between the prime mover and the load, said transmission having means including a plurality of clutches engageable to selectively establish any one of a plurality of drive ratios therethrough, first control means for shifting said transmission by engaging selected clutches to set said transmission to a desired drive ratio, second control means for engaging said modulated clutch comprising a modulating actuator for engaging said modulated clutch when energized to a degree proportional to the current flow therethrough, first and second electric current regulators including adjustable means for setting the current flow therethrough, a circuit means connecting said modulating actuator and said first and second electric current regulators, and means to supply an electric current to said circuit sufficient to energize said modulating actuator and completely engage said modulated clutch and in response to the engagement of said transmission clutches to establish a drive ratio through said transmission whereby the actual current flow and therefore the degree of engagement of said modulated clutch is proportional to the combined settings of said electric current regulators and occurs only after said transmission clutches are engaged.

5. In a system for driving a load from a prime mover, the combination comprising means including a modulated clutch and a multi-ratio transmission adapted to be drivingly interposed in tandem between the prime mover and the load, said transmission having a plurality of clutches engageable in different patterns to provide a plurality of drive ratios, a control member selectively movable to a plurality of positions, means including a plurality of actuators for engaging respective ones of said clutches in response to being energized, means responsive to the movement of said control member into different ones of its positions for energizing respective combinations of said actuators and thus setting said transmission in a corresponding one of its drive ratios, means including a modulating electrical actuator for engaging said modulated clutch to a degree substantially proportional to the current flow through such actuator, a control circuit for supplying a predetermined current through said modulating actuator to engage said modulated clutch to a selected degree, means responsive to movement of said control member away from any of said positions for interrupting said control circuit and disengaging said modulated clutch, and means responsive to the location of said control member in any one of said positions for re-establishing said control circuit to re-engage said modulated clutch, whereby said modulated clutch is automatically disengaged and re-engaged as an incident to shifting of the transmission from one drive ratio to another.

6. In a system for driving a load from a prime mover, the combination comprising means including a modulated clutch and a multi-ratio transmission adapted to be drivingly interposed in tandem between the prime mover and the load, said transmission having a plurality of clutches engageable in different patterns to provide a plurality of drive ratios, a plurality of solenoid coils and actuators responsive to energization of said coils for engaging the clutches and placing said transmission in selected ones of the drive ratios, a control member selectively movable to a plurality of positions each corresponding to a drive ratio of the transmission, an electrical switch for each drive ratio disposed to be set from a non-conducting to a conducting state when said control member is moved to the corresponding position, a voltage source, circuit means responsive to closure of each electrical switch for energizing a corresponding one of said solenoid coils from said source to engage the corresponding transmission clutch when the control member is moved to a corresponding position, a modulating electrical actuator for engaging the modulated clutch when energized and to a degree proportional to the current flow through the actuator, a clutch control switching device, a control circuit including said switching device for supplying electric current from said energizing source to said modulating electrical actuator, and means responsive to movement of said control member away from or into any of said positions for respectively opening or closing said switching device to disengage or re-engage said modulated clutch as an incident to shifting of the transmission from one drive ratio to another.

7. In a system for driving a load from a prime mover, the combination of a modulated clutch and a multi-drive-ratio transmission adapted to be drivingly interposed in tandem between the prime mover and the load, said transmission having a plurality of clutches engageable in patterns to establish any one of a plurality of drive ratios through the transmission, a solenoid coil and actuator associated with each clutch and adapted to engage the clutch in response to the coil being energized, a family of electrical circuits connected to energize said solenoid coils, a control member movable to a plurality of positions each corresponding to one of the drive ratios of the transmission including means responsive to such movement for energizing the circuits and engaging the clutches to set the transmission to the corresponding drive ratio, a modulating electrical actuator for engaging the modulated clutch when energized and to a degree proportional to the current flow therethrough, an electrical circuit connected to energize said modulating actuator and including switching means, means for sensing and signaling when said transmission clutches are disengaged, and means responsive to signaling by said sensing means that said transmission clutches are disengaged to open said switching means and thereby deenergize said modulating actuator and disengage said modulated clutch each time said transmission drive ratio is changed.

8. In a system for driving a load from a prime mover, the combination comprising means including a modulated clutch and a multi-ratio transmission adapted to be drivingly interposed in tandem between the prime mover and the load, said transmission having a plurality of clutches engageable in a plurality of patterns to establish any one of a plurality of drive ratios through the transmission, means including a solenoid coil and actuator corresponding to each drive ratio for engaging said clutches in response to energization of the coil to place the transmission in a selected one of said drive ratios, a modulating electrical actuator for engaging the modulated clutch when energized to a degree proportional to the current flow through the actuator, an electrical power source, first circuit means connecting said source to a selected one of said solenoid coils for energizing the same and shifting said transmission to the corresponding drive ratio, switching means actuated only when one of said transmission clutches is engaged, and second circuit means for connecting said power source to said modulating electrical actuator only when said switching means is actuated, whereby said modulated clutch can be engaged to produce drive through the transmission only after at least one of said transmission clutches is engaged.

9. In a system for driving a load from a prime mover, the combination comprising a modulated clutch and a multi-drive-ratio transmission adapted to be drivingly interposed in tandem between the prime mover and the load, said transmission having means including a plurality of clutches engageable to selectively establish any one of a plurality of drive ratios therethrough, a plurality of electrical actuators responsive to energization thereof for engaging respective ones of said clutches, an electrical power source, a control member movable to a plurality of positions each corresponding to one of the drive ratios of the transmission, a plurality of first switches adapted to be selectively actuated by said control member being moved to said positions, a first family of electrical circuits connecting said power source, switches and electrical actuators such that respective ones of said actuators will be energized by the closing of respective ones of said first switches as said control member is moved to the various drive ratio selection positions to set the transmission in the corresponding drive ratio, a modulating electrical actuator for engaging the modulating clutch when energized and to a degree proportional to current flow through the actuator, second circuit means connecting said electrical power source and said modulating electrical actuator including a second switching means, means included in said second circuit means for causing the current flow to always gradually increase to a predetermined value when the circuit is energized, and means responsive to said transmission being set to a drive ratio to close said second switching means and thereby gradually engage the modulated clutch after each movement of the control member to set the transmission in a drive ratio.

10. In a system for driving a load from a prime mover, the combination comprising a modulated clutch and a multi-ratio transmission adapted to be drivingly interposed in tandem between the prime mover and the load, said transmission having means including a plurality of clutches engageable to selectively establish any one of a plurality of drive ratios therethrough, a plurality of electrical actuators responsive to energization thereof for engaging respective ones of said clutches, an electrical power source, first circuit means connecting said source to any selected one of said electrical actuators for energizing said actuator and shifting said transmission to a selected drive ratio, switching means actuated only when one of said electrical actuators is energized, a modulating electrical actuator for engaging the modulated clutch when energized to a degree proportional to the current flow through the actuator, second circuit means for connecting said electrical power source and said modulating electrical actuator in response to actuation of said switching means, said second circuit means including means for causing current flow through said modulator to gradually increase substantially linearly until it reaches a predetermined value, whereby said modulated clutch may only be engaged when a drive ratio has been established through said transmission and is thereafter gradually engaged.

11. In a system for driving a load from a prime mover, the combination comprising a transmission having input and output shafts adapted for coupling respectively to the prime mover and the load, said transmission having means including first and second clutches respectively engageable to produce forward or reverse drive of said output shaft relative to the direction of rotation of said input shaft, first and second electrical actuators and means responsive to excitation thereof for respectively engaging said first and second clutches, means including first and second controllable switching devices in first and second electrical circuits for selectively exciting said first and second actuators, first and second direction selector control means for applying control signals to said first and second switching devices to render the latter selectively and complementally conductive, means for sensing and signaling when said output shaft is turning in a given direction with a speed greater than a predetermined value, and means responsive to signaling by said sensing means for rendering one of said switching devices immune to the control signals from said selector control means, said one device being that which in its conductive state results in drive of said output shaft in a direction opposite to said given direction.

12. In a system for driving a load from a prime mover, the combination comprising a transmission having input and output shafts adapted to be respectively coupled to the prime mover and the load, said transmission having means including first and second clutches respectively engageable to produce forward and reverse drive of said output shaft relative to the direction of rotation of said input shaft, first and second solenoid coils and actuators responsive to energization of said coils for respectively engaging said first and second clutches, an electrical power source, means for producing forward or reverse signals respectively when the output shaft is turning above a predetermined speed in a forward or reverse direction, a first controllable switching device connecting said first solenoid coil and said electrical power source, a second controllable switching device connecting said second solenoid coil and said electrical power source, first and second control means for supplying control signals to said first and second switching devices to selectively and complementally render the latter conductive, means responsive to said forward signal for overriding the effect of any control signal supplied to said first device and maintaining the latter non-conductive, and means responsive to said reverse signal for overriding the effect of any control signal supplied to said second device and maintaining the latter non-conductive, whereby said transmission may not be engaged to produce a drive opposite to the direction the output shaft is turning above said predetermined speed.

13. In a system for driving a load from a prime mover, the combination comprising a transmission having input and output shafts for coupling respectively to the prime mover and load, said transmission having means including first and second clutches respectively engageable to produce forward and reverse drive of said output shaft relative to the direction of rotation of said input shaft, first and second solenoid coils and actuators responsive to energization of said coils for respectively engaging said first and second clutches, an electrical power source, first and second sensing means for respectively signaling when the output shaft is turning above a predetermined speed in a forward or reverse direction, first circuit means including a signal-controlled switching device for energizing first solenoid coil from said source, second circuit means including a second signal-controlled switching device for energizing said second solenoid coil from said source, means to supply control signals to said first and second devices to selectively and complementally complete said first and second circuit means to shift said transmission into forward or reverse drive, means responsive to signaling by said second sensing means for overriding any said control signal supplied to said first device and maintaining the latter non-conductive, and means responsive to signaling by said first sensing means for overriding any said control signal supplied to said second device and maintaining the latter non-conductive.

14. In a system for driving a load from a prime mover, the combination comprising a transmission having input and output shafts adapted to be respectively coupled to the prime mover and the load, said transmission having means including first and second clutches respectively engageable to drive the output shaft in one direction or the other relative to the direction of rotation of the input shaft, first and second electrical actuators and means responsive to excitation thereof for respectively engaging said first and second clutches, means including first and second electrical circuits respectively having first and second signal-controlled switching devices therein selectively conductive for selectively exciting said first and second actuators, means for supplying control signals to said first and second devices to selectively and complementally render them conductive, means for sensing and signaling when said output shaft is turning above a predetermined speed in said one direction, means responsive to signaling by said sensing means for overriding the effect of control signals applied by said last-named means to said second device to hold the latter non-conductive, and means for rendering said overriding means ineffective if said second device is conductive prior to signaling by said sensing means and until said second device is rendered at least momentarily non-conductive.

15. In a system for driving a vehicle traction member from a prime mover, the combination comprising a multi-ratio transmission adapted to be drivingly interposed between the prime mover and the traction member, said transmission having means including a plurality of clutches selectively engageable to establish a plurality of forward drive ratios between input and output shafts, a plurality of electrical actuators and means responsive to energization of different combinations thereof for engaging different combinations of said clutches to establish different drive ratios, means including a family of electrical circuits each including a transistor selectively rendered conductive by control voltages applied thereto for selectively energizing said actuators to produce different ones of said transmission forward drive ratios, sensing means for signaling when said transmission output shaft is turning above a predetermined speed in the reverse direction, means responsive to signaling by said sensing means for overriding the control voltages applied to any of said transistors to thus prevent conduction of all the transistors and to prevent placing of said transmission in a forward drive ratio, and means for rendering said disabling means ineffective if any combination of said transistors is already conductive and unless and until all of said transistors are made momentarily non-conductive.

16. In a system for driving a vehicle traction member from a prime mover, the combination comprising a multi-ratio transmission adapted to be drivingly interposed between the prime mover and the traction member, said transmission having means including a plurality of clutches selectively engageable to establish any one of a plurality of forward drive ratios or a plurality of reverse drive ratios between input and output shafts, a plurality of electrical actuators and means responsive to excitation of different combinations thereof for engaging different combinations of said clutches to establish different ones of said drive ratios, means including a first family of electrical circuits for selectively exciting said actuators to produce different ones of said transmission forward drive ratios, means including a second famliy of electrical circuits for selectively exciting said actuators to produce different ones of said reverse drive ratios, first and second sensing means for respectively signaling when said transmission output shaft is turning above a predetermined speed in a forward or reverse direction, first disabling means responsive to signaling by said second sensing means for disabling said first family of circuits, second disabling means responsive to signaling by said first sensing means for disabling said second family of circuits, means for rendering said first disabling means ineffective if one of said first family of circuits is completed prior to signaling by said second sensing means and for so long as that one circuit remains completed, and means for rendering said second disabling means ineffective if one of said second family of circuits is completed prior to signaling by said first sensing means and for so long as that one circuit remains completed.

17. In a system for driving a load from a prime mover, the combination comprising a transmission having input and output shafts adapted for coupling respectively to the prime mover and the load, said transmission having means including first and second clutches respectively engageable to produce forward and reverse drive of said output shaft relative to the direction of rotation of said input shaft, first and second electrical actuators and means responsive to excitation thereof for respectively engaging said first and second clutches, means including first and second electrical circuits containing first and signal-controlled switching devices for selectively exciting said first and second actuators, means for supplying control signals to said first and switching devices to render the same selectively and complementally conductive, means for sensing and signaling when said output shaft is turning in a given direction with a speed greater than a predetermined value, inhibit means responsive to signaling by said sensing means for overriding any control signal applied to the device for exciting the actuator which causes said transmission to drive said output shaft in a direction opposite to said given direction, indicating means for sensing and signaling the occurrence of an operating condition of said system under which it may be desirable to set the transmission for drive in a direction opposite to said given direction even while the output shaft is turning in the given direction, and means responsive to signaling of said indicating means for disabling said inhibit means.

18. In a system for driving a traction member of a vehicle from a prime mover, the combination comprising a transmission having input and output shafts drivingly coupled to the prime mover and traction member, respectively, said transmission having means including first and second clutches respectively engageable to drive the output shaft in one direction or the other relative to the direction of rotation of the input shaft, first and second electrical actuators and means responsive to excitation thereof for respectively engaging said first and second clutches, means including first and second electrical circuits having first and second transistors for selectively exciting said first and second actuators, means for selectively applying control voltages to said transistors to render them selectively and complementally conductive, first sensing means for signaling when said output shaft is turning faster than a predetermined speed and which direction said shaft is turning, means responsive to signaling by said first sensing means for removing any control voltage which might otherwise be applied to that one of said transistors in the circuit for engaging that one of said clutches which drives the output shaft in a direction opposite to the direction sensed thereby preventing shifting of said transmission for drive of the vehicle in one direction when it is traveling in the other direction and above said predetermined speed, a braking system for selectively retarding said traction member to brake the vehicle, second sensing means for signaling when said braking system is inoperative, and means responsive to signaling by said second sensing means for rendering said removing means ineffective, thereby to permit slowing and stopping of the vehicle when it is rolling in said other direction by shifting said transmission for drive in said one direction.

19. In a system for driving a load from a prime mover, means including a modulated clutch adapted to be drivingly interposed between the prime mover and the load, an electrical modulating actuator for engaging said modulated clutch when energized and to a degree proportional to the current flow through said actuator, means including a first operator-adjustable device for producing a first adjustable control signal, means including a second operator-adjustable device responsive to said first control signal for producing a second control signal which varies both according to changes in the first signal and adjustments of the second device, and means for supplying electric current through said modulating actuator which varies in accordance with said second control signal, so that the degree of engagement of said modulated clutch is determined by the combined settings of said first and second devices.

20. In a system for driving a load from a prime mover, means including a modulated clutch adapted to be drivingly interposed between the prime mover and the load, a modulating actuator including an electric coil for engaging said modulated clutch when energized and to a degree proportional to the current flow through said coil, means including a first potentiometer adjustable by an operator for producing a first variable control voltage, means responsive to said first voltage and including a second potentiometer adjustable by an operator for producing a second variable control voltage which varies jointly with changes in the first voltage and the setting of the second potentiometer, and means for supplying through said coil an electric current which in magnitude varies in accordance with said second control voltage, thereby to engage the modulated clutch to a degree determined by the combined settings of said first and second potentiometers.

21. In a system for driving a load from a prime mover through a multi-ratio transmission which may be set to a neutral condition, the combination comprising, an electrical control system adapted for connection to a voltage source, said control system including a plurality of electrical actuators, and means responsive to energization of different combinations of said actuators for placing said transmission in different respective ones of its drive ratios and for placing said transmission in its neutral condition when none of the actuators is energized, a control member selectively movable to a plurality of control positions each corresponding to one of said drive ratios and to a neutral position, a pair of input terminals adapted for connection to a voltage source, a pair of voltage supply lines, latching means set to a latched state in response to a momentary input signal for connecting said supply lines to said terminals, means for starting said prime mover, means for supplying an input signal to said latching means to set the latter in its latched state when the control member is in said neutral position so that the source voltage appears between said supply lines, means for energizing a particular combination of said actuators from the voltage between said supply lines in response to said member being located in a corresponding one of said control positions and for deenergizing all such actuators in response to location of said control member in said neutral position, and means for resetting said latching means to its unlatched state in response to operation of said starting means, whereby said prime mover may be started when the control member is in any position, but no drive of the load occurs until the member is thereafter moved at least momentarily to its neutral position.

22. In a system for driving a vehicle from a prime mover through a multi-ratio transmission, the combination comprising, a plurality of clutches in said transmission, means including an electrical actuator for each of said clutches for engaging that one clutch when the corresponding actuator is energized, said transmission being in neutral when none of said actuators is energized, a control member selectively movable to a plurality of control positions each corresponding to one of said actuators and to a neutral position, a source of electrical energy, a pair of supply lines, means controlled by said control member for establishing a circuit between said supply lines through a corresponding one of said actuators when the member is in each of its control positions, means for starting said prime mover, switch means closed only when said control member is in its neutral position, and means effective only after said prime mover has been started for connecting said supply lines to said source in response to at least momentary closure of said switch means, whereby the prime mover may be started when the control member is in any position but the vehicle cannot be driven until such member has first been momentarily placed in its neutral position after starting of the prime mover.

23. In a system for driving a load from a prime mover through a multi-ratio transmission which may be set to a neutral condition, the combination comprising, a plurality of electrical actuators, means responsive to energization of different combinations of said actuators for placing said transmission in different respective ones of its drive ratios and for placing said transmission in its neutral condition when none of the actuators is energized, a control member selectively movable to a plurality of control positions each corresponding to one of said drive ratios and to a neutral position, an electrical control system adapted to receive a supply voltage from a voltage source, means including a silicon controlled rectifier for connecting the system to the voltage source, means for starting said prime mover, means for resetting said controlled rectifier to its non-conducting state during operation of said starting means thereby to disable the control system and place the transmission in neutral while the prime mover is being started, and means effective only when said starting means are not operating and responsive to said control member being in said neutral position for supplying an input signal to said rectifier to set the latter in its conducting state, whereby said prime mover may be started when the control member is in any position, but no drive of the load occurs until the member is thereafter at least momentarily moved to its neutral position.

24. In a system for driving a load from a prime mover, the combination comprising means including a modulated clutch and a multi-ratio-reversible transmission adapted to be drivingly interposed in tandem between the prime mover and the load, said transmission having a first plurality of clutches selectively engageable in a plurality of patterns and a second plurality of clutches selectively engageable in a plurality of patterns, one plurality of clutches being engageable in different patterns to set the available drive directions and the other plurality of clutches being engageable in different patterns to set the available drive ratios of said transmission, a control member selectively movable to a plurality of positions each corresponding to one of the available drive ratio and direction combinations of the transmission, means responsive to movement of said member into one of its positions for engaging said first plurality of clutches in a pattern corresponding to said one position, means responsive jointly to movement of said member into said one position and to the engagement of said first plurality of clutches in any pattern for engaging said second plurality of clutches in a pattern corresponding to said one position, and means responsive to engagement of said second plurality of clutches for causing engagement of said modulated clutch.

25. In a system for driving a load from a prime mover, the combination comprising means including a modulated clutch and a multi-ratio transmission adapted to be drivingly interposed in tandem between the prime mover and the load, said transmission having a first plurality of clutches selectively engageable in a plurality of patterns to establish any one of a plurality of drive ratios and a second plurality of clutches selectively engageable in a plurality of patterns to establish any one of a plurality of drive directions, a control member selectively movable to a plurality of positions each corresponding to one of the available drive ratio and direction combinations of the transmission, means responsive to movement of said member into one of its positions for engaging said first plurality of clutches in a pattern to establish in the transmission the drive ratio corresponding to said one position, means responsive jointly to movement of said member into said one position and to the engagement of said first plurality of clutches in a pattern for engaging said second plurality of clutches in a pattern to establish in the transmission the drive direction corresponding to said one position, and means responsive to engagement of said second plurality of clutches in a pattern for causing gradual engagement of said modulated clutch.

No references cited.

MARK M. NEWMAN, *Primary Examiner.*

A. T. McKEON, *Assistant Examiner.*